United States Patent

Spencer

[15] 3,704,770
[45] Dec. 5, 1972

[54] ADJUSTABLE TIME DELAY ELECTROMAGNETIC CLUTCH

[72] Inventor: Glenn S. Spencer, Horseheads, N.Y.
[73] Assignee: The Bendix Corporation
[22] Filed: Sept. 21, 1971
[21] Appl. No.: 182,339

[52] U.S. Cl. ............... 192/52, 192/84 R, 192/84 A, 192/84 AB, 188/164
[51] Int. Cl. ............................................ F16d 27/06
[58] Field of Search ........ 192/52, 84 R, 84 A, 84 AB; 188/161, 164

[56] References Cited

UNITED STATES PATENTS

| | | | |
|---|---|---|---|
| 727,641 | 5/1903 | Knowlton | 192/84 AB |
| 727,689 | 5/1903 | Reist | 192/84 AB |
| 786,413 | 4/1905 | Cutler | 192/84 AB |
| 859,523 | 7/1907 | Rowell | 192/84 AB |
| 1,671,057 | 5/1928 | Brainard | 192/84 R |

*Primary Examiner*—Allan D. Herrmann
*Attorney*—Bruce A. Yungman

[57] ABSTRACT

An electromagnetic clutch or brake including means for retarding or slowing the engagement and/or release of the armature is shown herein. An additional coil comprising one or more turns of high current capacity wire is included within the magnet body forming an electromagnetic coupling with the main coil in order to impede the generation and/or collapse of the main coil-induced electromagnetic field. A variable resistor or equivalent means is connected in series circuit relationship with the additional coil in order to selectively vary the amount of eddy current permitted to be induced in the additional coil, therefore providing means for regulating the response time of the armature to energization and deenergization of the primary coil. Control means connected in series circuit relationship with the additional coil and variable resistor comprising at least one diode and a switch may also be included so that application of the magnetically retarding coil can be selective and/or unidirectional.

9 Claims, 2 Drawing Figures

PATENTED DEC 5 1972 3,704,770

ADJUSTABLE TIME DELAY ELECTROMAGNETIC CLUTCH

CROSS REFERENCE TO RELATED APPLICATIONS

This case is related to my commonly assigned copending patent applications Ser. Nos. 182,337 and 182,338 filed on even date.

FIELD OF THE INVENTION

This invention relates generally to a d.c. time delay electromagnetic relay, and more particularly to an electromagnetic coupling operatively associated with an electromagnetic clutch.

BRIEF DESCRIPTION OF THE PRIOR ART

When an electromagnetic clutch is energized, the change in magnetic flux level, from zero to nominal operating level, causes a voltage to be induced in any nearby metal. In the iron of the clutch magnet body and armature plate, this results in a large eddy current which follows a circular path, opposite and parallel to the coil current and perpendicular to the flux. The magnetomotive force created by this eddy current opposes that of the main coil current and results in slowing the rate at which the magnetism rises. When the clutch is deenergized, the falling flux again generates a large eddy current, this time flowing in the opposite direction, (i.e., in the same direction as the coil current) producing a magnetomotive force which aids the main field and delays its collapse. The slow magnetic response that such induced currents cause, both at energization and at deenergization of the coil, is generally undesirable. Commonly assigned U. S. Pat. No. 3,327,822 covers a clutch in which an interruption in the iron ring of the magnet body and armature eliminates the eddy current and speeds the magnetic response.

Rapid response, however, is not always a desirable feature. In single surface clutches of the dry friction type, for example, a slow application of torque is generally preferable because of the "soft clutching" and "feathering in" resulting therefrom. This is particularly true where a clutch has been sized to the stall torque of the prime mover. Such a clutch would other deliver excessive shock torques in normal day to day service, causing abnormal wear of the clutch faces and possible breakage of associated drive members.

SUMMARY OF THE INVENTION

In order to overcome the inherent defects of a rapidly responding electromagnetic clutch as described above, a second coil consisting of at least one complete turn of copper or other high current capacity material is nested with the main coil in a cavity in the clutch magnet body. This second coil provides a current path with much higher conductivity than the iron of the magnet body and results in an increased and more effective eddy current. Variable resistance means is connected in series circuit relationship with the second coil so that the amount of eddy current flow through the second coil may be regulated. The generated flux of the main magnetic field having to overcome the increased magnetomotive opposition generated by the second coil will build and decay more slowly and clutch torque will be applied and released more gradually, the time of flux build-up and decay being a direct function of the setting of the variable resistance means. Switching means and/or diode means connected in series circuit relationship with the second coil and the variable resistance means may also be included so that application of the magnetically retarding coil can be selective and/or unidirectional.

It is, therefore, a primary object of this invention to provide an improved electromagnetic friction device having adjustable means for retarding the magnetic response of the electromagnetic members upon energization and/or deenergization of the primary electromagnetic coil, so that transmitted torque will be applied and/or released more gradually.

It is another object of this invention to provide an adjustable time delay electromagnetic clutch or brake in which the time of engagement and/or disengagement may be regulated.

It is still another object of this invention to provide an adjustable time delay electromagnetic clutch having second electromagnetic coil means and variable resistance means for regulating the electromagnetic response of the armature upon energization and/or deenergization of the primary electromagnetic coil, the second coil means being in electromagnetic flux circuit relationship with the primary electromagnetic coil.

It is a still further object of this invention to provide an adjustable time delay electromagnetic clutch which takes advantage of the inherent characteristics of an electromagnetic coupling thereby retarding clutch engagement and/or disengagement by impeding the generation and/or collapse of the coil induced electromagnetic field whenever the primary coil is energized and/or deenergized.

It is yet another object of this invention to provide an electromagnetic clutch or brake having means for slowing the electromagnetic response of the armature such that the torque transmission between input and output members is gradually applied and/or released.

It is still another object of this invention to provide an adjustable time delay electromagnetic clutch which eliminates excessive shock torques thereby prolonging the life of the clutch faces and the associated drive members.

It is a still further object of this invention to provide in a time delay electromagnetic clutch having second electromagnetic coil means for retarding the magnetic response of the armature to the primary coil, control means for selecting the desired direction of eddy current flow in the second coil means so that the second coil means will be conductive and therefore retard the response of the armature upon clutch engagement and/or upon clutch disengagement as desired.

It is a still further object of this invention to provide in a time delay electromagnetic clutch having second electromagnetic coil means and adjusting means for regulating the magnetic response of the armature to the primary coil, switching means located externally of the clutch so that the regulated retarding effect of the time delay coil may be selectively applied or completely disconnected from the electromagnetic circuit.

It is even a further object of this invention to provide in an adjustable time delay electromagnetic clutch having second electromagnetic coil means and regulating means for selectively varying the amount of eddy current permitted to flow in the second coil means, means for establishing substantially unidirectional eddy current flow therein so that the second coil means will generate magnetomotive opposition to a change in flux level developed by the primary coil only when the second coil means is conductive, thereby retarding the magnetic response of the armature in one direction only. The means for establishing substantially unidirectional eddy current flow in the second coil means is located externally of the clutch so that the permitted direction of eddy current flow may be selected or changed externally, either by manual or automatic control.

Other objects and advantages of this invention will become apparent from the following detailed description taken in conjunction with the accompanying drawings.

DETAILED DESCRIPTION OF THE PREFERRED EMBODIMENT

Figure 1:
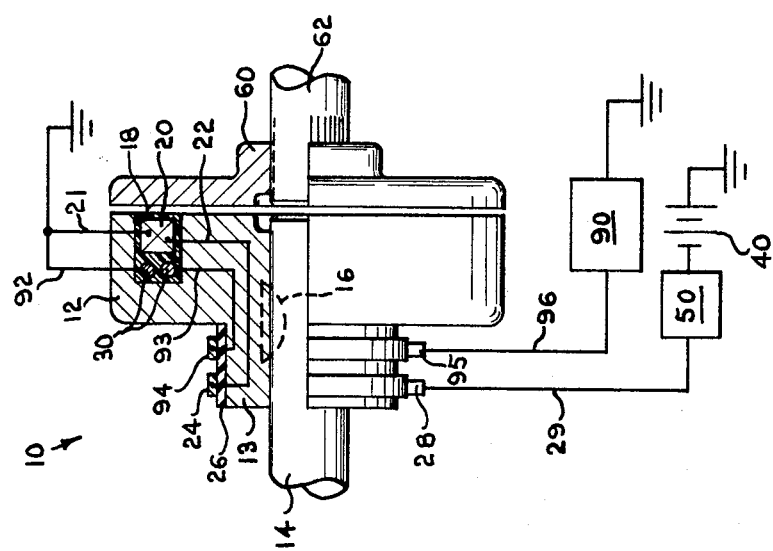
FIG. 1 shows a schematic partial cross-sectional view of the preferred embodiment of my electromagnetic clutch.

Referring to FIG. 1 of the drawing, my electromagnetic clutch is shown, generally designated by numeral 10. The clutch includes a rotatable magnet body 12 adapted to be secured to a first torque transmitting means, power shaft 14, by means of a key and key-way slot shown generally as 16. Although the preferred embodiment relates specifically to an electromagnetic clutch, it should be obvious to those skilled in the art that the teaching of my invention may be equally applied to an electromagnetic brake where the magnet body member 12 does not normally rotate; also, my invention would be equally effective in a stationary field clutch where the coil 20 and magnet body 12 are non-rotatable members. Magnet body 12 is fabricated of magnetic flux conducting material such as iron or steel. An annular recess or cavity 18 is formed within the magnet body 12 and has disposed therein the primary electromagnetic coil 20 and the separate but substantially adjacent time delay coil 30 of my invention. Coils 20 and 30 may be secured within cavity 18 by resin or other conventional means.

Coil 20 has two leads, 21 and 22; lead 21 is connected to ground and lead 22 is connected to slip ring 24. Slip ring 24 is fixedly secured to an annular electrical insulation member 26. Member 26 is fabricated from rubber or other suitable electrical insulating material and is mounted on an axially extending shoulder 13 provided on magnet body 12. Electrical power is supplied to slip ring 24 from battery 40 through lead 29 which is connected to a brush 28. Lead 29 and power source 40 are in circuit relationship with a control circuit shown generally as the box 50, which control circuit triggers the energization and/or deenergization of the primary coil 20.

The clutch of the present invention is reversible with respect to input and output sides and thus, clutch structure which in one installation would be an input member in another installation would be an output member. Accordingly, rotating input and output members are referred to generically as first and second torque transmitting members.

Juxtaposed and coaxially aligned with magnet body 12 is armature 60. Armature 60 is slidably splined to the terminal end of second torque transmitting means, power shaft 62. Armature 60 is adapted to move toward and away from engagement with the magnet body 12 upon energization and deenergization of the electromagnetic coil 20. The axial mating faces of magnet body 12 and armature 60 are the clutch faces through which torque is transmitted. Of course, my invention could also be used in a multiple disc clutch, a cone type clutch, etc., where the magnet body and the armature are not the principal torque transmitting friction members.

Coil 30 also has two leads, 92 and 93; lead 92 is connected to ground and lead 93 is connected to slip ring 94 which is fixedly secured to annular insulation member 26 in a manner similar to slip ring 24. The induced current developed in coil 30 is carried to control means 90 through brush 95 and lead 96.

Figure 2:
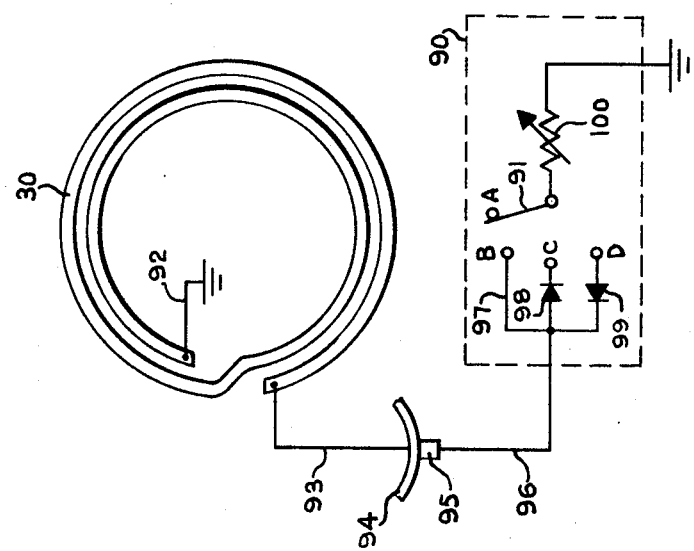
FIG. 2 is a schematic of the coil of my invention and its accompanying control means shown in FIG. 1.

Referring to FIG. 2, coil 30 is shown as a discontinuous double turn of high current capacity wire, the terminal ends of which are mounted to lead wires 92 and 93. Coil 30 is preferably fabricated from copper or other conductive material which provides a current path with much higher conductivity than the iron of magnet body 12 thus producing a stronger more effective eddy current. It would be obvious to those skilled in the art that the actual configuration of coil 30 is a matter of design choice, since without taking into account control means 90 described below, it is the cross-sectional area of coil 30 that is normally determinative of the armature's response time; e.g., a solid ring of twice the cross-section will provide the same time delay effect as the two rings shown. Without regulating the amount of eddy current permitted to develop in coil 30, the cross-sectional area of coil 30 and the armature response time are directly proportional, holding the size and strength of coil 20 constant; that is, the larger the cross-sectional area of coil 30, the longer the response time of the armature.

Coil 30 is shown as having substantially the same diameter of coil 20, both coils being coaxial and perpendicular to the axis of the clutch. However, it is important to recognize that the diameter and position of coil 30 relative to coil 20 is unimportant so long as an electromagnetic coupling is formed by the two coils and the coils are, therefore, in electromagnetic flux circuit relationship. For example, time delay coil 30 would still perform its function if it were disposed around the O.D. of primary coil 20, or within its I.D., or at any other position so long as it embraced the magnetic field generated by the primary coil 20.

The control means 90 which is in communication with coil 30 through lead 96 as described above, consists of a four-position switch 91, two diodes 98 and 99 which are in parallel circuit relationship with lead 96 and two of the terminals of the switch 91, a lead 97 interconnecting lead 96 to one terminal of switch 91, and a variable resistor 100 connected in series to the ground terminal of switch 91. The four operative positions of switch 91, position A, position B, position C, and position D are as follows: position A is the open circuit position; position B is the closed circuit position which interconnects coil 30 and the variable resistance means 100; position C connects switch 91 to the cathode of diode 98; and, position D connects switch 91 to the anode of diode 99. Switching means 91 of control circuit means 90 may be manually moved between the above mentioned positions, or movement of switch 81 may be automatically controlled as a feedback or other function of a separate control circuit (not shown).

Reference has been made throughout to variable resistance means, adjusting means, regulating means, all three means being used synonymously. Although I have specifically shown a variable resistor 100 as part of the control means 90, one skilled in the art would realize that substantially equivalent mechanical forms of the variable resistor include a potentiometer and a rheostat, which two devices may also be used with equal effectiveness in my invention. The type of electromechanical device chosen to be used in control means 90 will be dictated by the environment in which my clutch is sued. For example, although a potentiometer and a variable resistor are basically the same, a rheostat is a variable resistor which has one fixed terminal and a movable contact. Potentiometers may be used as rheostats, but a rheostat cannot be used as a potentiometer because connections cannot be made to both ends of the resistance element. Therefore, use of the three more or less generic terms noted above has been made throughout since the type of device used to vary the resistance is relatively immaterial so long as manual or automatic means for accomplishing this function is included in the time delay circuit.

OPERATION OF THE PREFERRED EMBODIMENT

Switch Position A

When clutch engagement is desired, a control signal is generated from the control circuit 50 and power is carried to coil 20 by means of the lead wires 22 and 29 and the brush and slip ring 28 and 24 thereby energizing coil 20. The change in flux linkage generated by coil 20 from zero to nominal operating level (the quiescent state) causes an electromotive force (emf), i.e., a voltage, to be induced across coil 30. Since coil 30 provides a current path with much higher conductivity than the iron of magnet body 12, a larger more effective momentary or eddy current would normally be induced in coil 30. However, with switch 91 in position A, an open circuit condition exists and therefore no eddy current can be developed in coil 30. The response of the clutch in this position is normal since coil 30 will not conduct a current either upon energization or deenergization of the primary coil 20.

Switch Position B

When clutch engagement is desired, a control signal is generated from the control circuit 50, coil 20 is energized, and a voltage is induced across coil 30 as described above. This emf induces a momentary or eddy current in coil 30 which follows a generally circular path opposite in direction and parallel to the primary coil current and perpendicular to the flux linkage generated by primary coil 20. A magnetomotive force created by this eddy current opposes that of the main coil current and results in slowing the rate at which magnetism rises in magnet body 12. The flux of the main magnetic field, having to overcome this increased opposition, will build more slowly thereby retarding the movement of armature 60 into engagement with magnet body 12; thus, clutch torque will be applied more gradually. If the clutch response time (the time it takes armature 60 to move into contact with magnet body 12 upon energization of primary coil 20) is to be increased, the resistance in the electromagnetic circuit shown in FIG. 2 is decreased by making the proper change in setting of the variable resistor 100. The decreased resistance permits a higher induced current in coil 30, resulting in a larger counter magnetomotive force and a corresponding reduction in the rate at which the main magnetic field rises. Therefore, armature 60 is drawn more slowly into contactive engagement with the magnet body 12. If the clutch response time is to be decreased, the resistance setting of variable resistor 100 is increased and less induced current is allowed to flow through coil 30; thus, the rate at which magnetism rises in magnet body 12 is increased resulting in a stronger more rapid magnetic attraction of armature 60. It can be seen therefore that the clutch response time and the amount of resistance in the electromagnetic circuit are inversely proportional, i.e., the time it takes armature 60 to respond to excitation of coil 20 may be increased or decreased depending on whether the resistance in the circuit is decreased or increased respectively.

When the electrical energy supplied to coil 20 is withdrawn, the falling flux again generates a large momentary current in coil 30, this time flowing in the opposite direction, (i.e., in the same direction as the coil current) producing a magnetomotive force which aids the main flux field and therefore delays its collapse. Thus, armature 60 is more gradually released from its contact with the magnet body 12. The rate at which armature 60 is released from its contact with magnet body 12 can be increased or decreased by increasing or decreasing the resistance setting of variable resistor 100, response rate being the inverse of response time.

Switch Position C

When clutch engagement is desired, a control signal is generated from the control circuit 50, coil 20 is energized, and a voltage is induced across coil 30 as described above. Assuming the polarity of the primary coil 20 is such that the voltage induced in coil 30 is in a clockwise direction, lead 93 will be of positive polarity and a circuit will be complete through slip ring 94, brush 95, external lead 96, diode 98, switch 91, variable resistor 100, through ground to coil lead 92. Since the diode 98 represents a very low resistance path in its forward-conducting direction, a relatively large eddy current will flow through coil 30 and the above external circuit during flux build-up. The magnetomotive force created by this eddy current opposes that of the main coil current and results in slowing the rate at which magnetism rises in magnet body 12. The flux of the main magnetic field, having to overcome this increased opposition, will build more slowly thereby retarding the movement of armature 60 into engagement with magnet body 12; thus, clutch torque will be applied more gradually. Upon deenergization of primary coil 20, the voltage induced in time delay coil 30 will be opposite in polarity from that induced when coil 20 was energized.

Since diode 98 is substantially conductive in one direction only (from anode to cathode) the eddy current path is now effectively blocked. Thus, no magnetomotive force is generated by coil 30 and armature 60 will respond to the deenergization of coil 20 in a normal manner. So long as the switch is in position C, the clutch will be slow to engage, but will disengage normally for every clutch engagement and disengagement cycle. Of course, if the response rate of armature 60 is to be increased or decreased whenever primary coil 20 is energized, the resistance in the external control means 90 is also increased or decreased respectively, by making the proper change in setting of the variable resistor 100.

Switch Position D

When clutch engagement is desired, a control signal is generated from the control circuit 50, coil 20 is energized, and a voltage is induced across coil 30 as described above. Again, assuming that the primary coil polarity is such that the voltage induced in coil 30 is in a clockwise direction, lead 93 will be of positive polarity and a circuit will be completed through slip ring 94, brush 95, external lead 96, diode 99, switch 91, variable resistor 100, through ground to coil lead 92. However, since diode 99 is substantially conductive in one direction only, the eddy current path is effectively blocked. Thus, no magnetomotive force is generated by coil 30 and armature 60 will respond to the energization of coil 20 in a normal manner. Upon deenergization of primary coil 20, the voltage induced in time delay coil 30 will be opposite in polarity from that induced when the coil was energized. Since diode 99 represents a very low resistance path in its forward-conducting direction, a relatively large eddy current is conducted through coil 30 and the above external control circuit. The magnetomotive force created by this current reinforces that of the main coil current and results in slowing the rate at which magnetism decays in the magnet body 12. The flux of the main magnetic field, being aided by this additional magnetomotive force, will decay more slowly thereby retarding the movement of armature 60 away from engagement with magnet body 12; thus, clutch torque will be released more gradually. So long as the switch is in position D, the clutch will have a normal engagement and a retarded disengagement every time coil 20 is energized and deenergized. The rate at which armature 60 is released from its contact with magnet body 12 can be increased or decreased by increasing or decreasing the resistance setting of variable resistor 100.

One skilled in the art would be quick to recognize that the switch position of switch 91 and the resistance setting of variable resistor 100 could be controlled by either manual and/or automatic means the type of control means used being a matter of design choice or being dictated by the parameters of the overall clutch environment.

While only one preferred embodiment of this invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

I claim:

1. In combination with an electromagnetic friction device of the type having a plurality of torque transmitting members, a magnet body operatively associated with at least one of said torque transmitting members, an armature operatively associated with at least one other of said torque transmitting members, said armature adapted to move toward and away from said magnet body, first electromagnetic coil means having an electrical power lead operative to generate magnetic flux attracting said armature into clutch engagement when energized and operative to release said armature from engagement when deenergized, and second coil means being in electromagnetic flux circuit relationship with said first electromagnetic coil means such that said first coil means causes an eddy current to be induced in said second coil means whenever energized and whenever deenergized, which eddy currents generate magnetomotive opposition to change in flux levels thereby retarding the magnetic response of the armature both upon engagement and disengagement, wherein the improvement comprises:

adjusting means for selectively varying the amount of eddy current permitted to flow in the second coil means, said adjusting means being in circuit relationship with the second coil means.

2. The combination as claimed in claim 1 wherein said adjusting means comprises variable resistance means connected in series circuit relationship with the second coil means.

3. The combination as claimed in claim 1 including further switching means in series circuit relationship with the second coil means and the adjusting means, said switching means having an open circuit position, and a closed circuit position.

4. The combination as claimed in claim 1 including further means for establishing substantially unidirectional eddy current flow in the second coil means, said means being in circuit relationship with the second coil means and the adjusting means.

5. The combination as claimed in claim 4 wherein said means for establishing substantially unidirectional eddy current flow in the second coil means comprises diode means connected in series circuit relationship with the second coil means and the adjusting means.

6. The combination as claimed in claim 4 including further switching means connected in series circuit relationship with the means for establishing substantially unidirectional eddy current flow having an open circuit position.

7. The combination as claimed in claim 4 including further switching means connected in parallel circuit relationship with the means for establishing substantially unidirectional eddy current flow having a closed circuit position which bypasses the means for establishing substantially unidirectional eddy current flow.

8. The combination as claimed in claim 4 including further switching means connected in series circuit relationship with the means for establishing substantially unidirectional eddy current flow having a position for selectively varying the amount of eddy current flow in the second coil means when the first coil means is energized.

9. The combination as claimed in claim 4 including further switching means connected in series circuit relationship with the means for establishing substantially unidirectional eddy current flow having a position for selectively varying the amount of eddy current flow in the second coil means when the first coil means is deenergized.

* * * * *